(12) United States Patent
Chan et al.

(10) Patent No.: US 8,057,246 B2
(45) Date of Patent: Nov. 15, 2011

(54) COMPACT MULTIPORT TEST JACK

(75) Inventors: Shuen-Yung Chan, New Market, MD (US); Joseph C. Roesch, Herndon, VA (US)

(73) Assignee: Tellabs Vienna, Inc., Naperville, IL (US)

( * ) Notice: Subject to any disclaimer, the term of this patent is extended or adjusted under 35 U.S.C. 154(b) by 1237 days.

(21) Appl. No.: 11/796,022

(22) Filed: Apr. 26, 2007

(65) Prior Publication Data

US 2008/0267359 A1 Oct. 30, 2008

(51) Int. Cl.
*H04M 1/24* (2006.01)

(52) U.S. Cl. .................. 439/188; 439/173; 439/676

(58) Field of Classification Search .............. 439/188, 439/173, 676, 170
See application file for complete search history.

(56) References Cited

U.S. PATENT DOCUMENTS

| 5,092,785 | A | * | 3/1992 | Chen .............................. 439/188 |
| 5,195,125 | A | | 3/1993 | Bliven et al. ..................... 379/29 |
| 6,074,256 | A | * | 6/2000 | Arnett ........................... 439/676 |
| 6,612,856 | B1 | * | 9/2003 | McCormack .................. 439/188 |
| 7,497,710 | B2 | * | 3/2009 | Spink et al. ................... 439/188 |
| 2007/0197073 | A1 | * | 8/2007 | Hu et al. ......................... 439/188 |

* cited by examiner

*Primary Examiner* — Gary F. Paumen
(74) *Attorney, Agent, or Firm* — Mark C. Pickering

(57) ABSTRACT

A multiport test jack that supports the testing of a number of individual telephone lines in an interface device, such as a network interface device or an optical line terminal, has a physical structure that is smaller in size than the size of a corresponding number of individual test jacks.

25 Claims, 8 Drawing Sheets

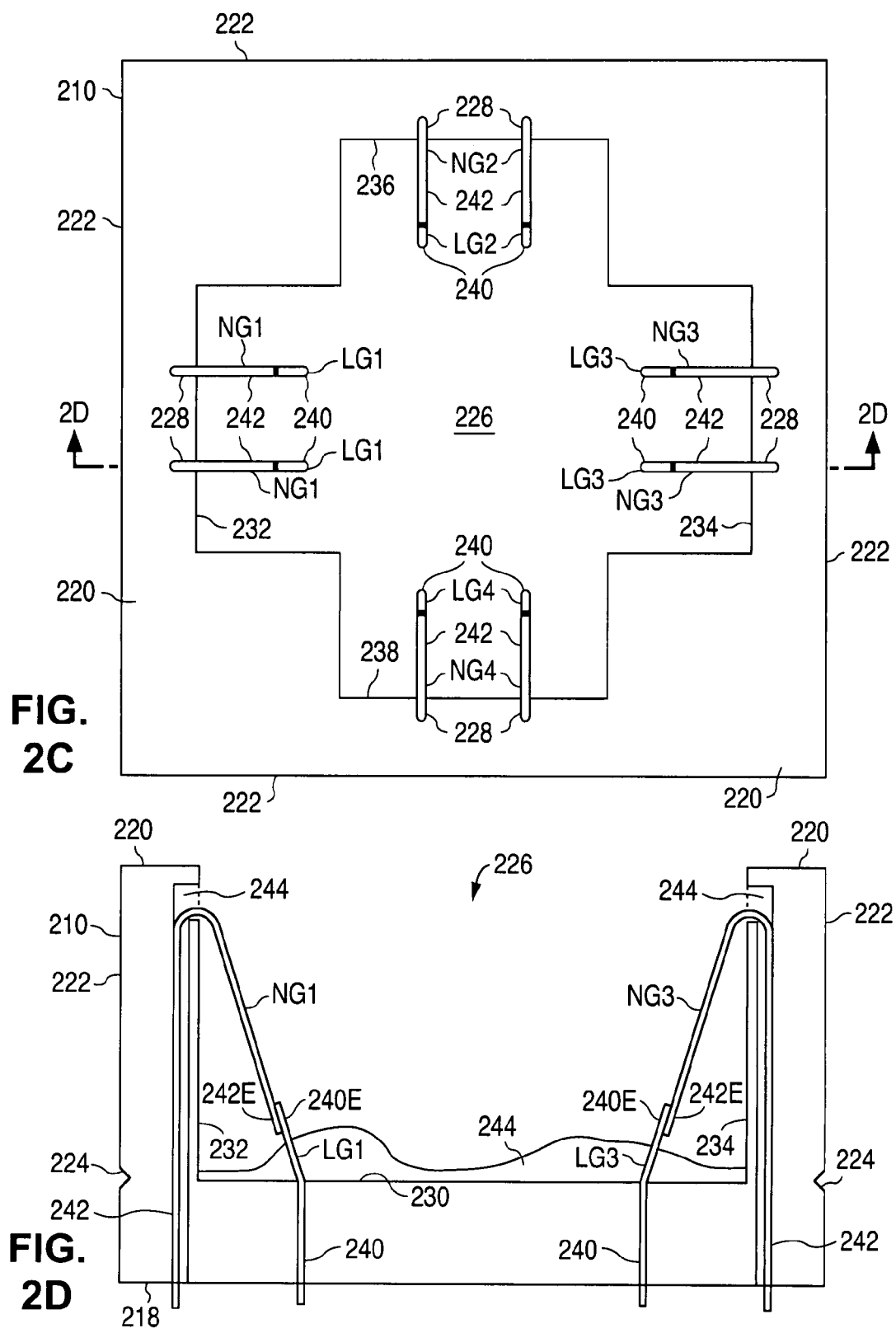

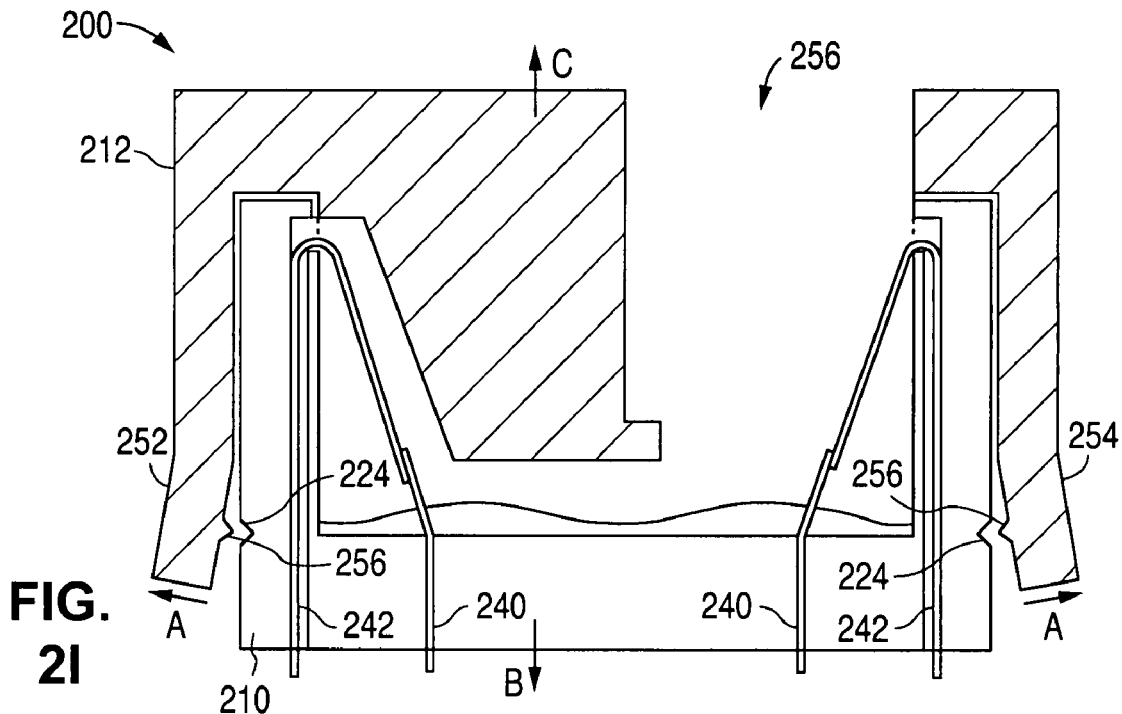
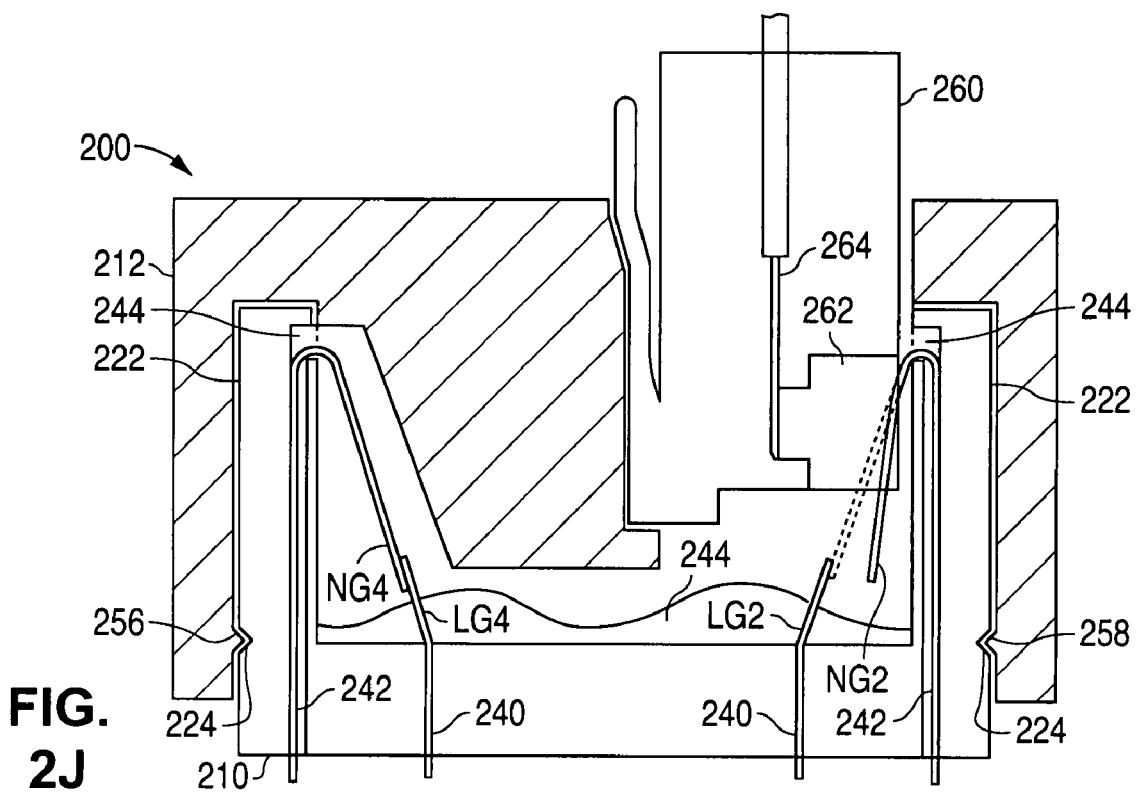

COMPACT MULTIPORT TEST JACK

BACKGROUND OF THE INVENTION

1. Field of the Invention

The present invention relates to test jacks and, more particularly, to a compact multiport test jack.

2. Description of the Related Art

In most cases, a telephone service provider is responsible for maintaining the wiring and providing service up to an interface device, such as a network interface device (NID) or an optical network terminal (ONT), which is typically attached to the outside of a customer premise. The customer is then responsible for maintaining the wiring from the interface device to the telephone jacks that are located throughout the customer premise, as well as the equipment that is connected to the telephone jacks.

Interface devices commonly include a test jack that provides a simple way to determine whether a service problem is the responsibility of the telephone service provider or the customer. A test jack is similar to a customer premise telephone jack. With a customer premise telephone jack, when a telephone plug, such as an RJ11 plug, is inserted into the jack, a telephone attached to the plug becomes electrically connected to the telephone network.

A test jack differs from a customer premise telephone jack in that when a telephone plug is inserted into the test jack, the customer premise wiring becomes electrically disconnected from the telephone network, and a telephone attached to the telephone plug becomes electrically connected to the telephone network. Thus, if a working telephone is plugged into the test jack and a dial tone is detected, any service problem lies within the customer premise. On the other hand, if no dial tone can be detected, then the service problem lies within the telephone network.

FIGS. 1A-1B show cross-sectional drawings that illustrate a prior art test jack 100. As shown in FIGS. 1A-1B, test jack 100 has a number of local wires 110 that can be electrically connected to the telephone jacks within the customer premise, and a number of network wires 112 that can be electrically connected to the telephone network. (Only one local wire 110 and one network wire 112 are shown in the figures.) Further, the network wires 112 are biased against the local wires 110 by way of the spring force that results from the shape, size, and material of the network wires 112.

In addition, test jack 100 has a cavity 116 that is designed to receive and hold a telephone plug 120, such as an RJ11 plug. Cavity 116, in turn, exposes the local wires 110 and the network wires 112. As a result, as shown in FIG. 1B, when telephone plug 120 is inserted into cavity 116 of test jack 100, plug 120 pushes the network wires 112 away from the local wires 110 to physically separate and electrically disconnect the ends of the network wires 112 from the ends of the local wires 110.

In addition, the insertion of telephone plug 120 into cavity 116 forces the ends of the network wires 112 into contact with conductive blades 122 in plug 120 (only one blade 122 is shown in the figures). The conductive blades 122, in turn, are connected to a telephone wire 124 which is connected to a working telephone. As a result, the insertion of telephone plug 120 into cavity 116 also places a working telephone into electrical contact with the telephone network.

One drawback of conventional test jacks is that each telephone line requires a separate test jack. As a result, in a multi-line setting, such as a multi-tenant commercial facility or a residence with multiple lines, a corresponding number of test jacks are required. A corresponding number of test jacks, however, requires a significant amount of space within the interface device. As a result, there is a need for a multiple line test jack that requires less space than a corresponding number of individual test jacks.

SUMMARY OF THE INVENTION

A multiport test jack is disclosed in accordance with a first embodiment of the present invention. The multiport test jack includes a body that has a top surface, an opening in the top surface, and a number of wires that are exposed by the opening. The opening has a bottom surface, a first side wall that extends from the bottom surface towards the top surface, and a second side wall that extends from the bottom surface towards the top surface. The first and second side walls lie in parallel planes. The number of wires includes two or more groups of local wires that extend into the opening, and two or more groups of network wires that extend into the opening. Each group of local wires lie adjacent to a different sidewall.

A multiport test jack is disclosed in accordance with a second embodiment of the present invention. The multiport test jack includes a body that has an opening, and a number of wires that are exposed by the opening. The number of wires includes two or more groups of local wires that extend into the opening, and two or more groups of network wires that extend into the opening. Each group of local wires supports a different telephone line.

A multiport test jack is disclosed in accordance with a third embodiment of the present invention. The multiport test jack includes a body that has a top body surface, an opening in the top body surface, and a number of wires that are exposed by the opening. The number of wires includes two or more groups of local wires that extend into the opening, and two or more groups of network wires that extend into the opening. The multiport test jack also includes a shroud that contacts the body. The shroud has a top shroud surface and an opening in the top shroud surface that exposes only a first group of local wires.

A method of operating a multiport test jack is disclosed in accordance with a fourth embodiment of the present invention. The method includes separating a body from a shroud. The body has a top body surface, an opening in the top body surface, and a number of wires that are exposed by the opening. The number of wires includes two or more groups of local wires that extend into the opening, and two or more groups of network wires that extend into the opening. The shroud has a top shroud surface, and an opening in the top shroud surface that directly exposes only a first group of network wires before the body is separated from the shroud. In addition, the method includes reconnecting the shroud and the body together after the body has been separated from the shroud so that only a second group of network wires is directly exposed by the opening in the top shroud surface.

A better understanding of the features and advantages of the present invention will be obtained by reference to the following detailed description and accompanying drawings that set forth an illustrative embodiment in which the principles of the invention are utilized.

BRIEF DESCRIPTION OF THE DRAWINGS

FIG. 2A is a plan view, while FIG. 2B is a cross-sectional view taken along lines 2B-2B of FIG. 2A.

FIGS. 2C-2D are views illustrating an example of body 210 after being separated from shroud 212 in accordance with the present invention. FIG. 2C is a plan view, while FIG. 2D is a cross-sectional view taken along lines 2D-2D of FIG. 2C.

FIG. 2E is a plan view, while FIG. 2F is a cross-sectional view taken along lines 2F-2F of FIG. 2E.

FIGS. 2G-2J are a series of cross-sectional views illustrating the operation of multiport test jack 200 in accordance with the present invention.

FIG. 3A is a plan view, while FIG. 3B is a cross-sectional view taken along lines 3B-3B of FIG. 3A.

DETAILED DESCRIPTION OF THE INVENTION

Figure 1A:
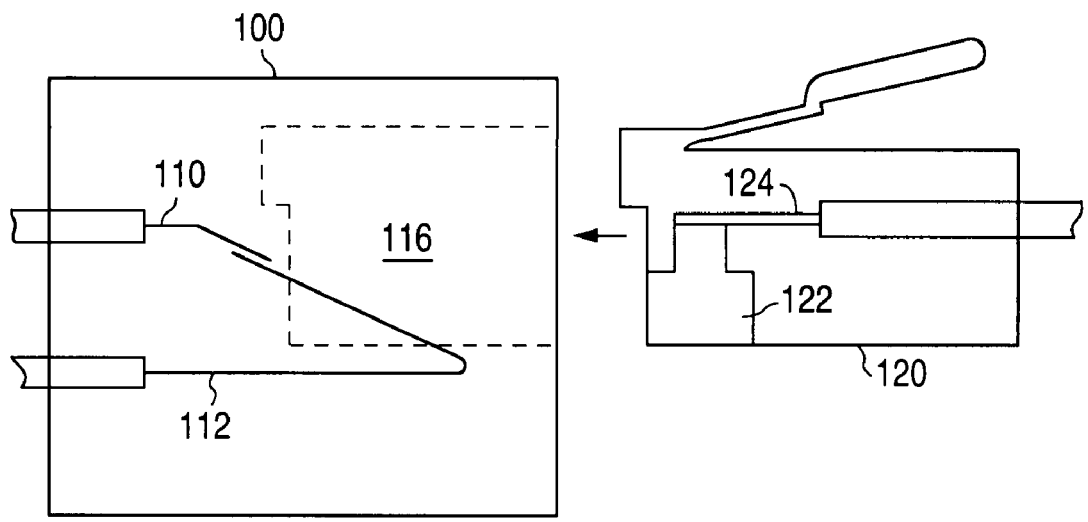
FIGS. 1A-1B are cross-sectional views illustrating a prior art test jack 100.
Figure 1B:
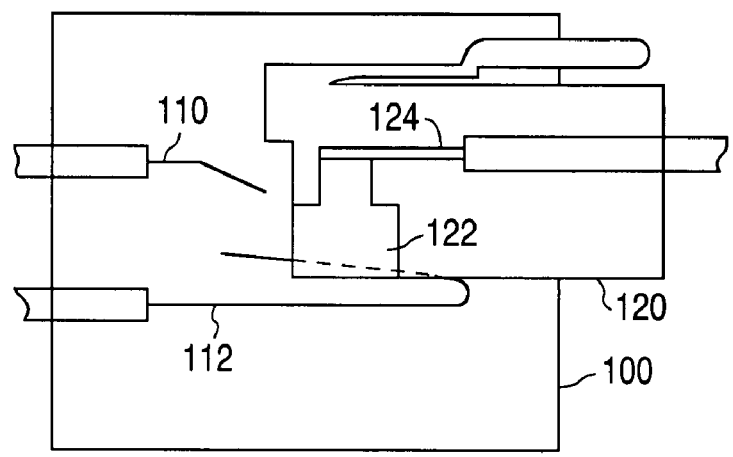
Figure 2A:
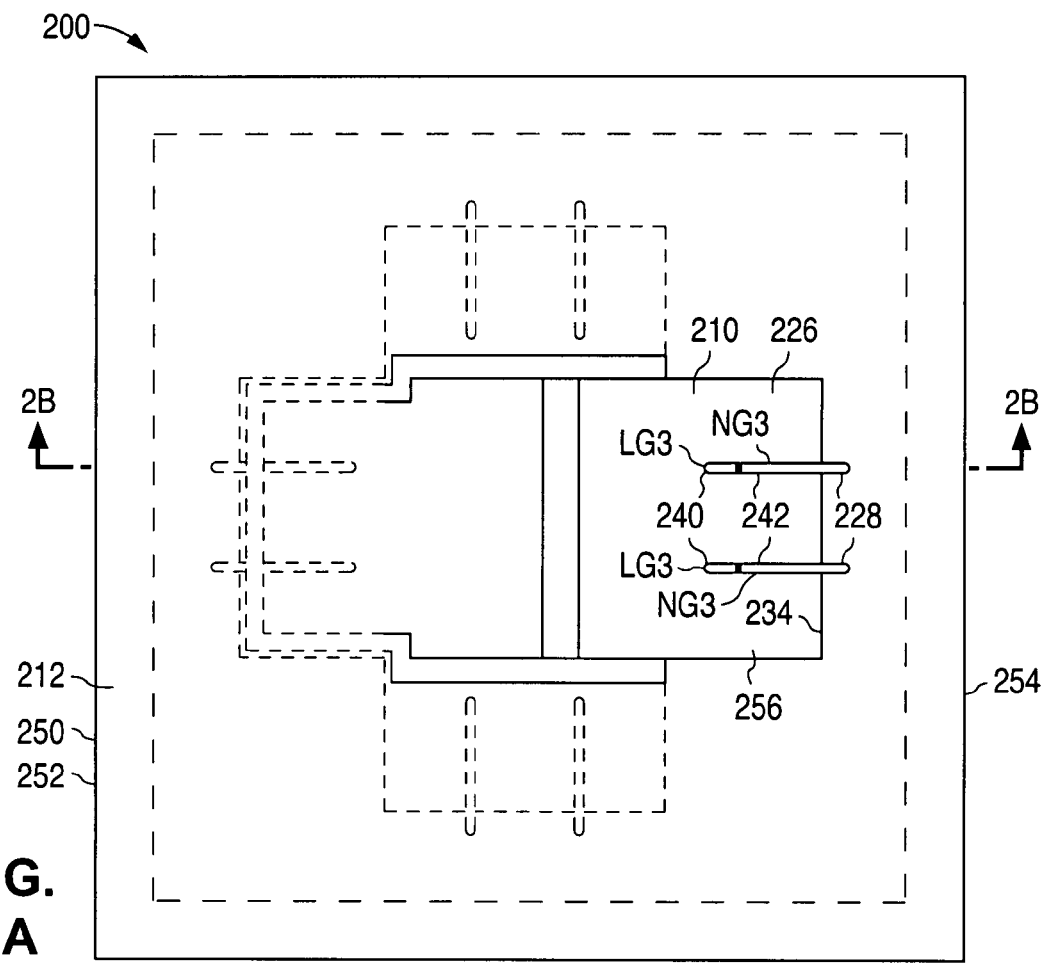
FIGS. 2A-2B are views illustrating an example of a multiport test jack 200 in accordance with the present invention.
Figure 2B:
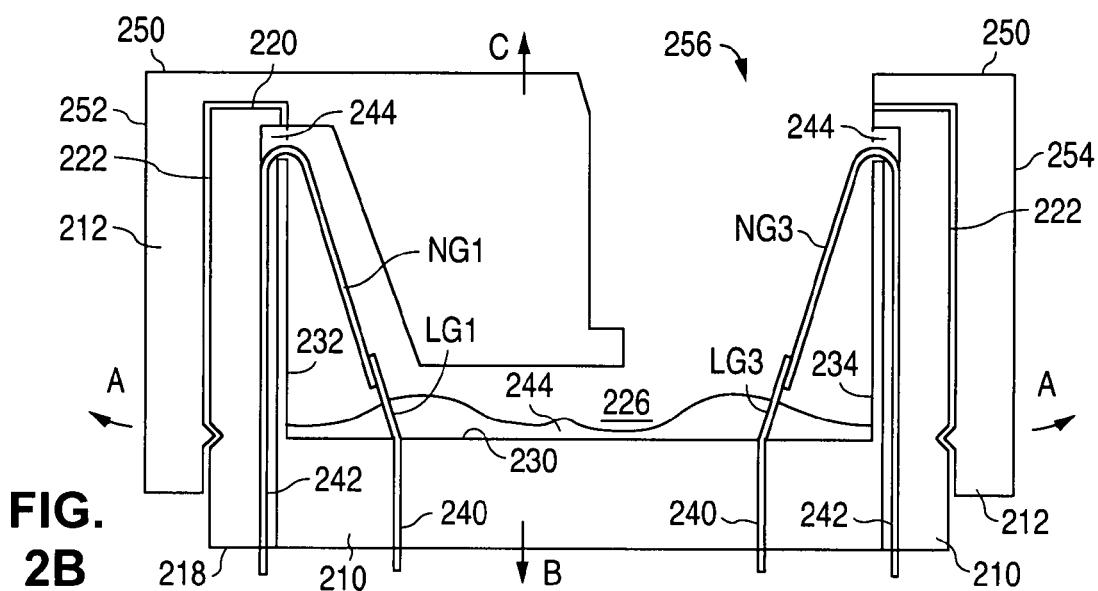

FIGS. 2A-2B show views that illustrate an example of a multiport test jack 200 in accordance with the present invention. FIG. 2A shows a plan view, while FIG. 2B shows a cross-sectional view taken along lines 2B-2B of FIG. 2A. As described in greater detail below, multiport test jack 200 provides multiple line support in a package that requires substantially less space than a corresponding number of individual test jacks.

As shown in the FIGS. 2A-2B example, multiport test jack 200 is a two-piece assembly that includes a body 210 and a shroud 212 that fits over body 210. Shroud 212 is removed from body 210 by pulling the sides of shroud 212 out as shown by arrow A, and then pulling body 210 and shroud 212 in opposite directions as shown by arrows B and C, respectively.

FIGS. 2C-2D show drawings that illustrate an example of body 210 after being separated from shroud 212 in accordance with the present invention. FIG. 2C shows a plan view, while FIG. 2D shows a cross-sectional view taken along lines 2D-2D of FIG. 2C. As shown in FIGS. 2A-2D, body 210 includes a bottom surface 218, a top surface 220, and a number of exterior side surfaces 222 that each extends from bottom surface 218 to top surface 220. Each exterior side surface 222, in turn, includes a notch 224.

In addition, body 210 also includes an opening 226 in top surface 220, and a number of wires 228 that are exposed by opening 226. Opening 226 has a bottom surface 230, a first side wall 232 that extends from bottom surface 230 towards top surface 220, and a second side wall 234 that extends from bottom surface 230 towards top surface 220. Second side wall 234 also faces first side wall 232, and lies in a substantially parallel plane. In addition, opening 226 has a third side wall 236 that extends from bottom surface 230 towards top surface 220, and a fourth side wall 238 that extends from bottom surface 230 towards top surface 220. Fourth side wall 238 also faces third side wall 236, and lies in a substantially parallel plane.

The number of wires 228, in turn, includes a number of local wires 240 that are arranged in two or more groups LG1-LGn (four groups in the present example), and a number of network wires 242 that are arranged in two or more groups NG1-NGn (four groups in the present example). Each local wire 240 has a switch end 240E. Similarly, each network wire 242 has a switch end 242E.

In addition, in the present example, the local wires 240 extend through the bottom surface 230 and into opening 226. Further, in accordance with the present invention, each group NG1-NGn of network wires 242 extends away from a different side wall of the side walls 232, 234, 236, and 238 into opening 226, and supports a different telephone line.

Further, the network wires 242 curve back and are formed from a gauge and type of material so that the ends 242E of the network wires 242 each have a spring force that, when connected to the ends 240E of the local wires 240, pushes the ends 242E of the network wires 242 against the ends 240E of the local wires 240. As a result, each group LG1-LGn of local wires 240 is connected to a corresponding group NG1-NGn of network wires 242 when opening 226 is empty (free of a plug). In addition, in order to environmentally protect the local and network wires 240 and 242, a gel 244 can optionally be placed to cover portions of the local and network wires 240 and 242.

Figure 2E:
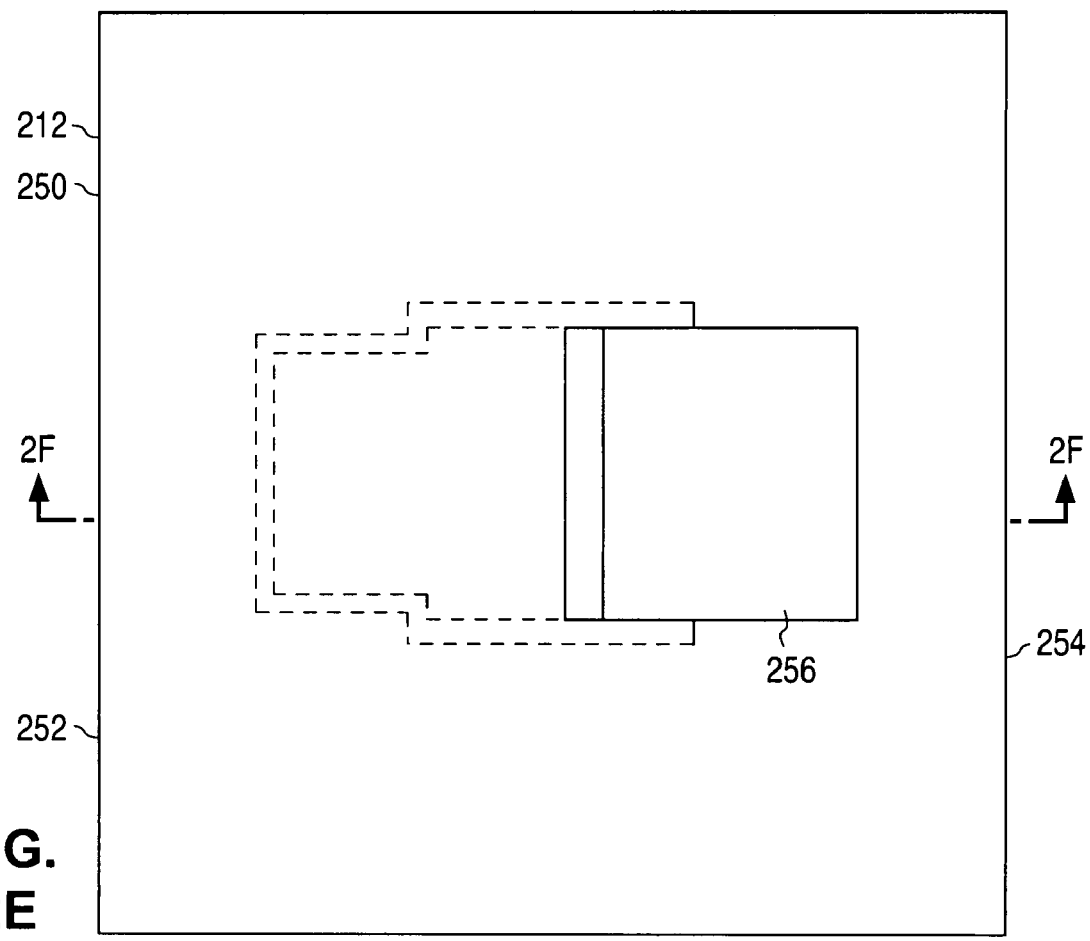
FIGS. 2E-2F are views illustrating an example of shroud 212 after being separated from body 210 in accordance with the present invention.
Figure 2F:
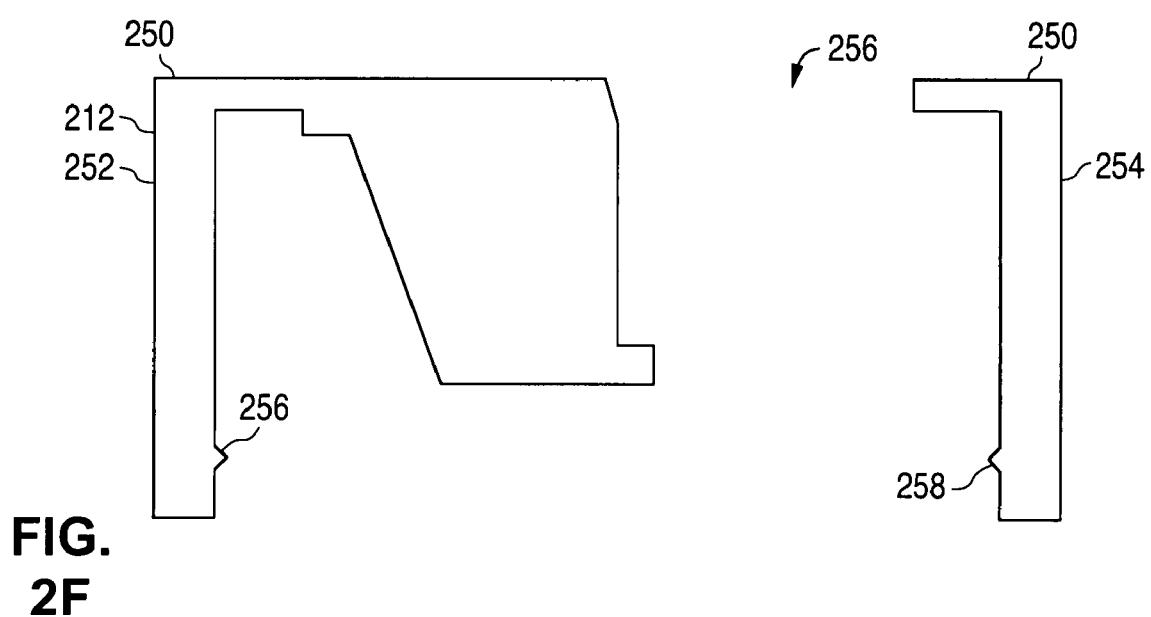

FIGS. 2E-2F show views that illustrate an example of shroud 212 after being separated from body 210 in accordance with the present invention. FIG. 2E shows a plan view, while FIG. 2F shows a cross-sectional view taken along lines 2F-2F of FIG. 2E. As shown in FIGS. 2A-B and 2E-2F, shroud 212 has a top surface 250, a first side wall 252 that extends away from top surface 250, and an opposing second side wall 254 that also extends away from top surface 250. First side wall 252 has a lower projection 256. Similarly, second side wall 254 has a lower projection 258.

As further shown in FIGS. 2A-B and 2E-2F, shroud 212 includes an opening 256 in top surface 250. In accordance with the present invention, opening 256 in top surface 250 exposes opening 226 in the top surface 220 of body 210, but directly exposes only one group LG of local wires 240 and only one group NG of network wires 242.

In addition, opening 256 is formed to receive and retain a plug, such as an RJ11 plug. Thus, opening 256 is formed so that, for example, an RJ11 plug can be inserted into, and removed from, shroud 212 in the same manner that an RJ11 plug is inserted into, and removed from, a conventional RJ11 receptacle.

FIGS. 2G-2J show a series of cross-sectional views that illustrate the operation of multiport test jack 200 in accordance with the present invention. As shown in FIGS. 2A-2D, when opening 256 in shroud 212 is free of a plug, each group LG of local wires 240 is connected to a corresponding group NG of network wires 242.

Figure 2G:
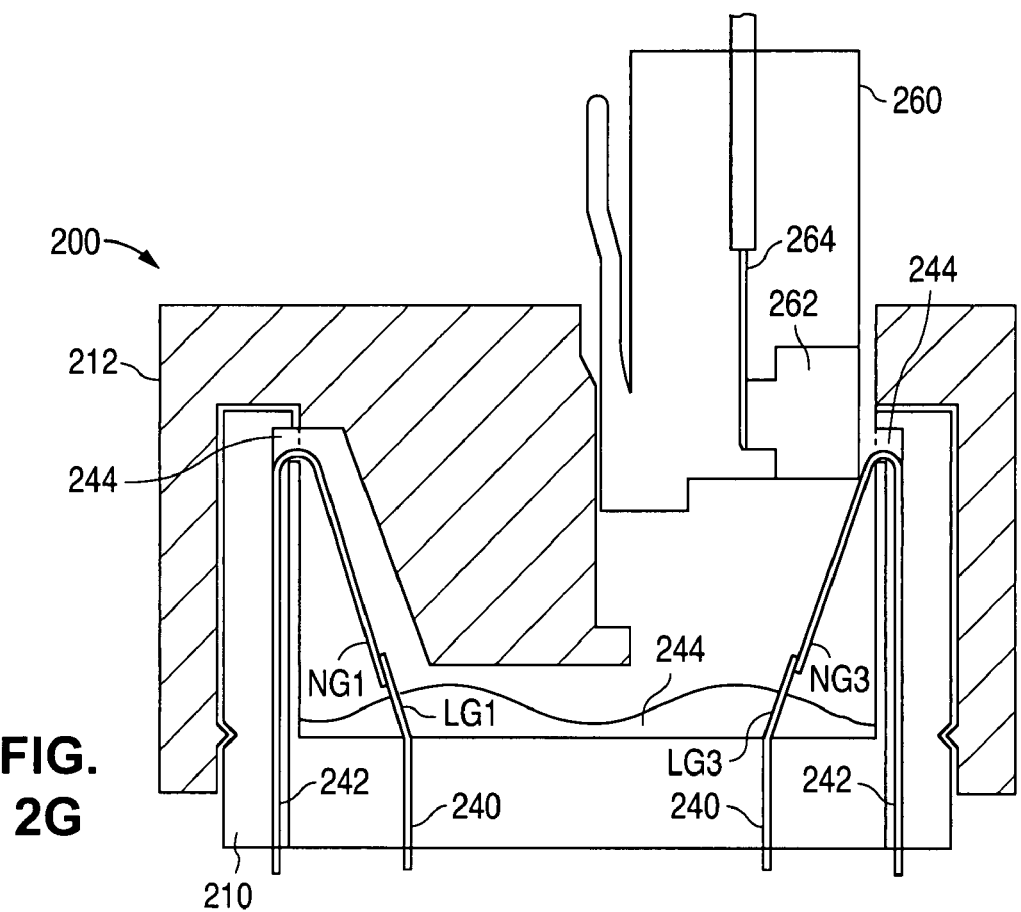

As shown in FIG. 2G, if a technician or customer wishes to check a telephone line following a service failure, such as the telephone line associated with the wires 240 and 242 in groups LG3 and NG3, a plug 260, such as an RJ11 plug, which is connected to a working telephone, is inserted into opening 256 in shroud 212. Plug 260 includes a number of conductive blades 262 (only one blade 262 is shown in FIG. 2G), which are electrically and physically connected to wires 264 (only one wire 264 is shown in FIG. 2G) that run to the working telephone.

Figure 2H:
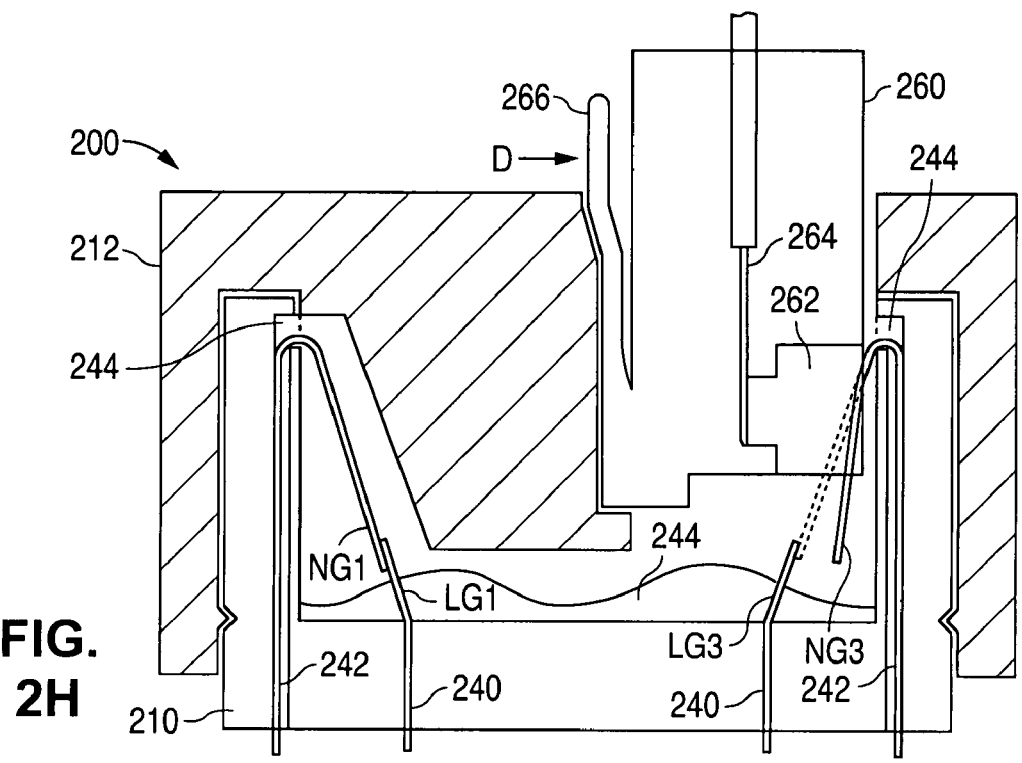

As shown in FIG. 2H, when plug 260 has been fully inserted into opening 256 such that shroud 212 retains plug 260, plug 260 contacts the network wires 242 of group NG3 and physically separates and electrically disconnects the network wires 242 of group NG3 from the local wires 240 of group LG3. Thus, plug 260 physically and electrically disconnects only one group LG of local wires 240 from only one group NG of network wires 242. In addition, at the same time, each of the network wires 242 of group NG3 make a physical and electrical connection with the blades 262 in plug 260, and thereby to the working telephone.

Thus, if a dial tone can be detected after plug 260 has been fully inserted into opening 256, then any service (wiring or equipment) related problem lies on the customer side. On the other hand, if a dial tone can not be detected, then the service problem lies on the telephone service provider side.

Following this, if a technician or customer wishes to check another telephone line, such as the telephone line associated with the wires 240 and 242 in groups LG2 and NG2, plug 260 is first removed by depressing a release arm 266 on plug 260 in the direction of arrow D, and then pulling plug 260 away from shroud 212.

Following this, as shown in FIG. 2I, shroud 212 is removed from body 210 by pulling the sides 252 and 254 of shroud 212 out as shown by arrow A so that projections 256 and 258 are pulled out from notches 224, and then pulling body 210 and shroud 212 in opposite directions as shown by arrows B and C, respectively.

Next, as shown in FIG. 2J, shroud 212 is rotated counter-clockwise 900 with respect to body 210, and then pushed back over body 210 until the projections 256 and 258 again engage the notches 224 in the exterior side walls 222. When plug 260 has again been fully inserted into opening 256 such that shroud 212 retains plug 260, plug 260 contacts the network wires 242 of group NG2 and physically separates and electrically disconnects the network wires 242 of group NG2 from the local wires 240 of group NG2. In addition, at the same time, each of the network wires 242 of group NG2 make a physical and electrical connection with the blades 262 in plug 260, and thereby to the working telephone.

Thus, a multiport test jack has been described in accordance with the present invention. One of the advantages of multiport test jack 200, which can be fabricated in the same manner that conventional test jacks are fabricated, is that multiport test jack 200 is substantially smaller than the combined size of a corresponding number of individual test jacks. In addition, when not in use, shroud 212 protects all but one of the connections between the local wires 240 and the network wires 242.

Figure 3A:
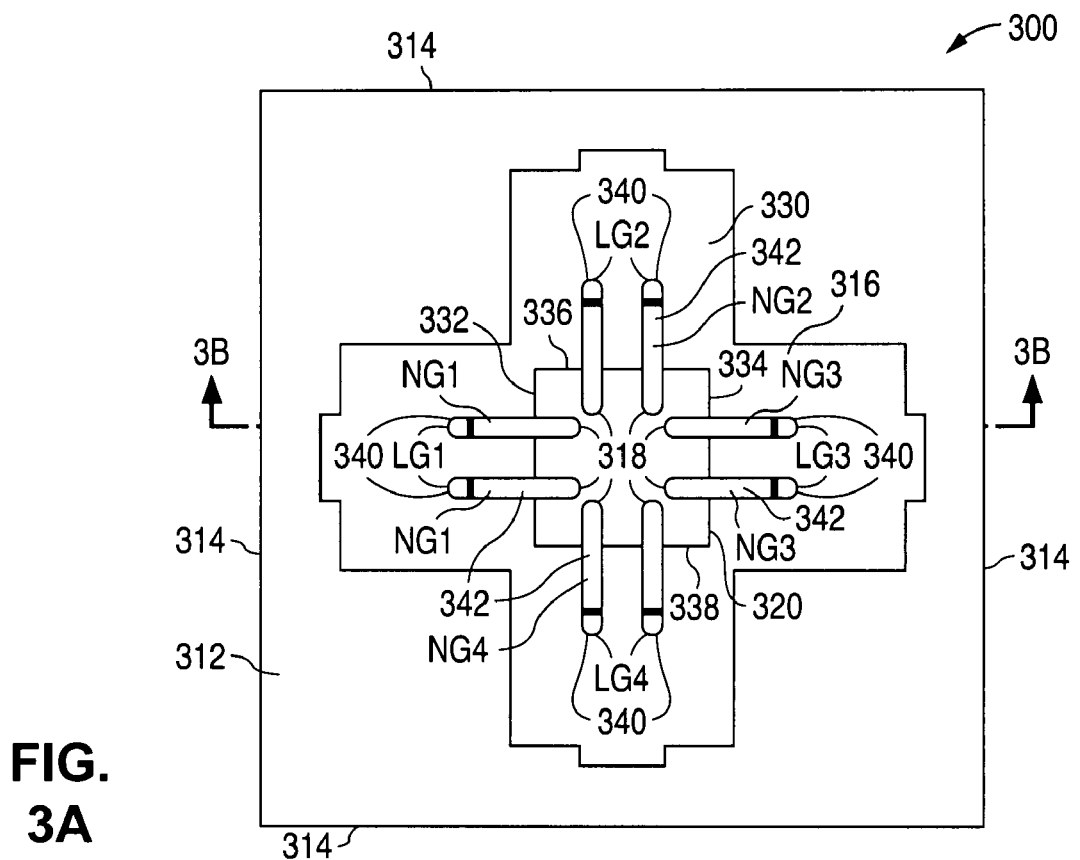
FIGS. 3A-3B are views illustrating an example of a multiport test jack 300 in accordance with an alternate embodiment of the present invention.
Figure 3B:
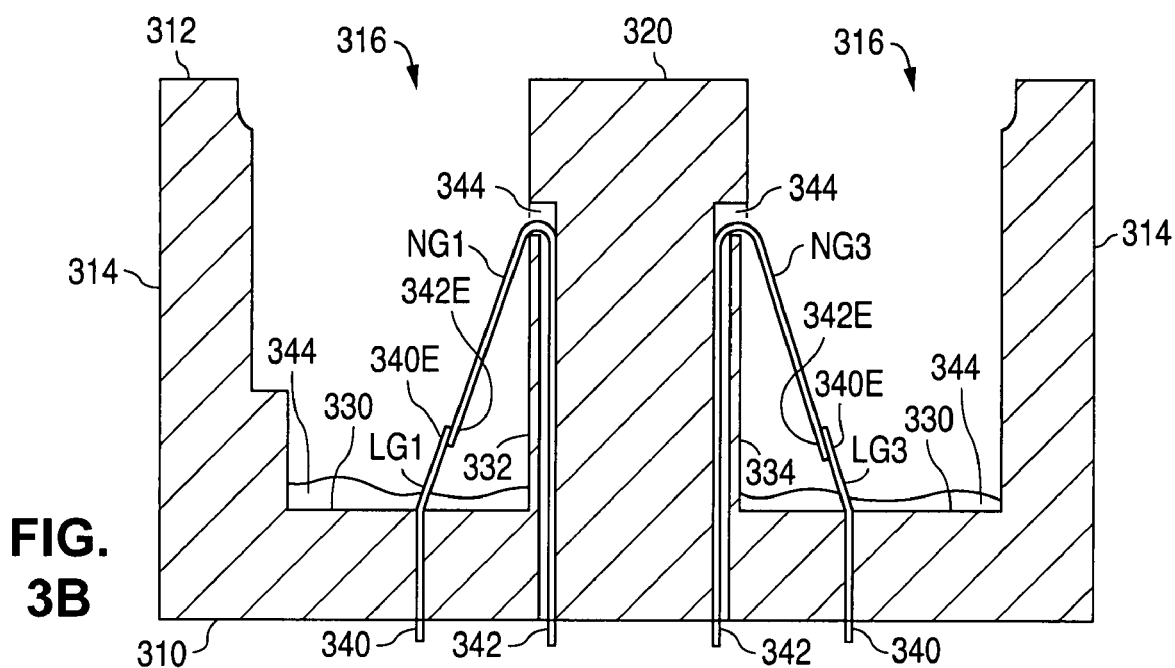

FIGS. 3A-3B show views that illustrate an example of a multiport test jack 300 in accordance with an alternate embodiment of the present invention. FIG. 3A shows a plan view, while FIG. 3B shows a cross-sectional view taken along lines 3B-3B of FIG. 3A. As shown in FIGS. 3A-3B, multiport test jack 300 includes a bottom surface 310, a top surface 312, and a number of exterior side surfaces 314 that each extends from bottom surface 310 to top surface 312.

Multiport test jack 300 also includes an opening 316 in top surface 312, and a number of wires 318 that are exposed by opening 316. In the present example, opening 316 has a square doughnut-type shape that defines a four-sided interior pedestal 320. Further, opening 316 has a bottom surface 330, a first side wall 332 that extends from bottom surface 330 towards top surface 312, and a second side wall 334 that extends from bottom surface 330 towards top surface 312. Second side wall 334 also faces away from first side wall 332, and lies in a substantially parallel plane. Opening 316 also has a third side wall 336 that extends from bottom surface 330 towards top surface 312, and a fourth side wall 338 that extends from bottom surface 330 towards top surface 312. Fourth side wall 338 also faces away from third side wall 336, and lies in a substantially parallel plane.

In addition, opening 316 is formed to receive and retain a plug, such as an RJ11 plug, in a number of different positions, but only one plug at a time. Thus, opening 316 is formed so that, for example, an RJ11 plug can be inserted into, and removed from, multiport test jack 300 in the same manner that an RJ11 plug is inserted into, and removed from, a conventional RJ11 receptacle.

The number of wires 318, in turn, includes a number of local wires 340 that are arranged in two or more groups LG1-LGn (four groups in the present example), and a number of network wires 342 that are arranged in two or more groups NG1-NGn (four groups in the present example). Each local wire 340 has a switch end 340E. Similarly, each network wire 342 has a switch end 342E.

In addition, in the present example, the local wires 340 extend through the bottom surface 330 and into opening 316. Further, in accordance with the present invention, each group NG1-NGn of network wires 342 extends away from a different side wall of the side walls 322, 324, 326, and 328 into opening 316, and supports a different telephone line.

Further, the network wires 342 curve back and are formed from a gauge and type of material so that the ends 342E of the network wires 342 each have a spring force that, when connected to the ends 340E of the local wires 340, pushes the ends 342E of the network wires 342 against the ends 340E of the local wires 340. As a result, each group LG1-LGn of local wires 340 is connected to a corresponding group NG1-NGn of network wires 342 when opening 316 is empty (free of a plug). In addition, in order to environmentally protect the local and network wires 340 and 342, a gel 344 can optionally be placed to cover portions of the local and network wires 340 and 342.

Figure 3C:
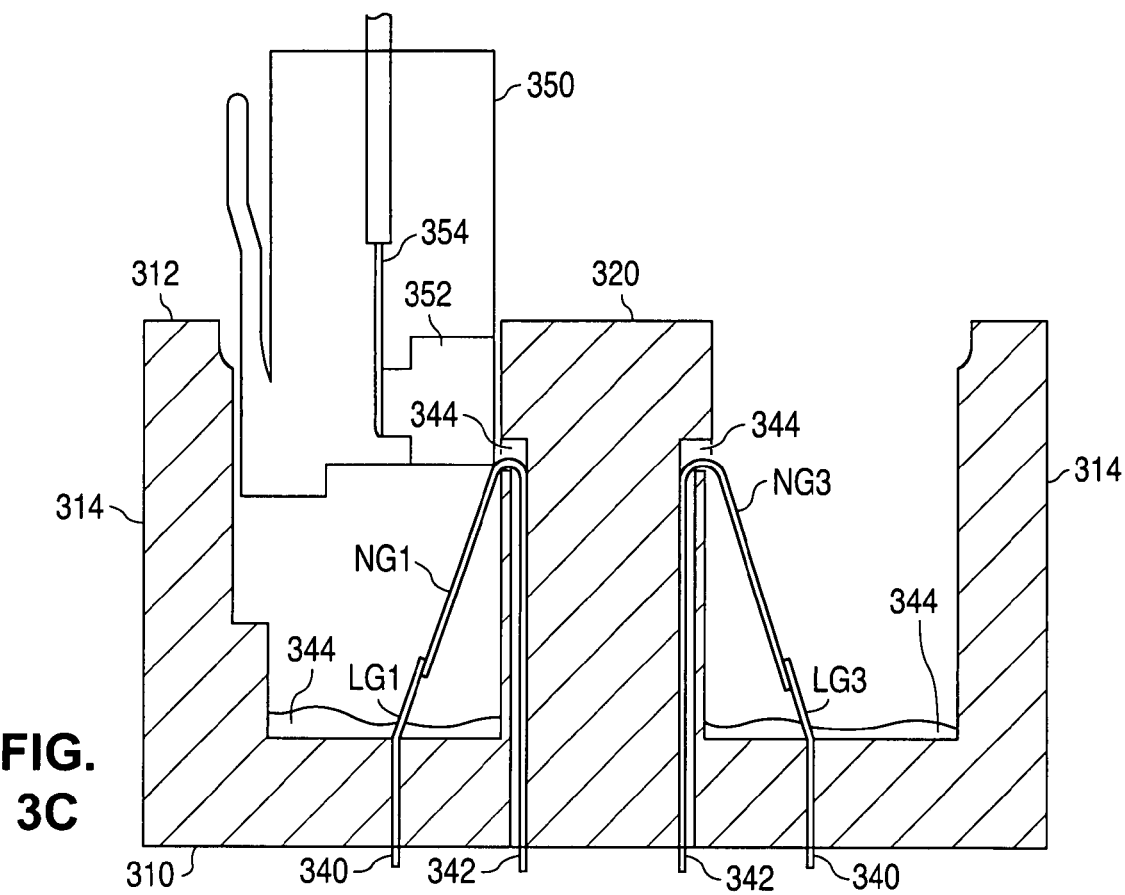
FIGS. 3C-3D are a series of cross-sectional views illustrating the operation of multiport test jack 300 in accordance with the present invention.
Figure 3D:
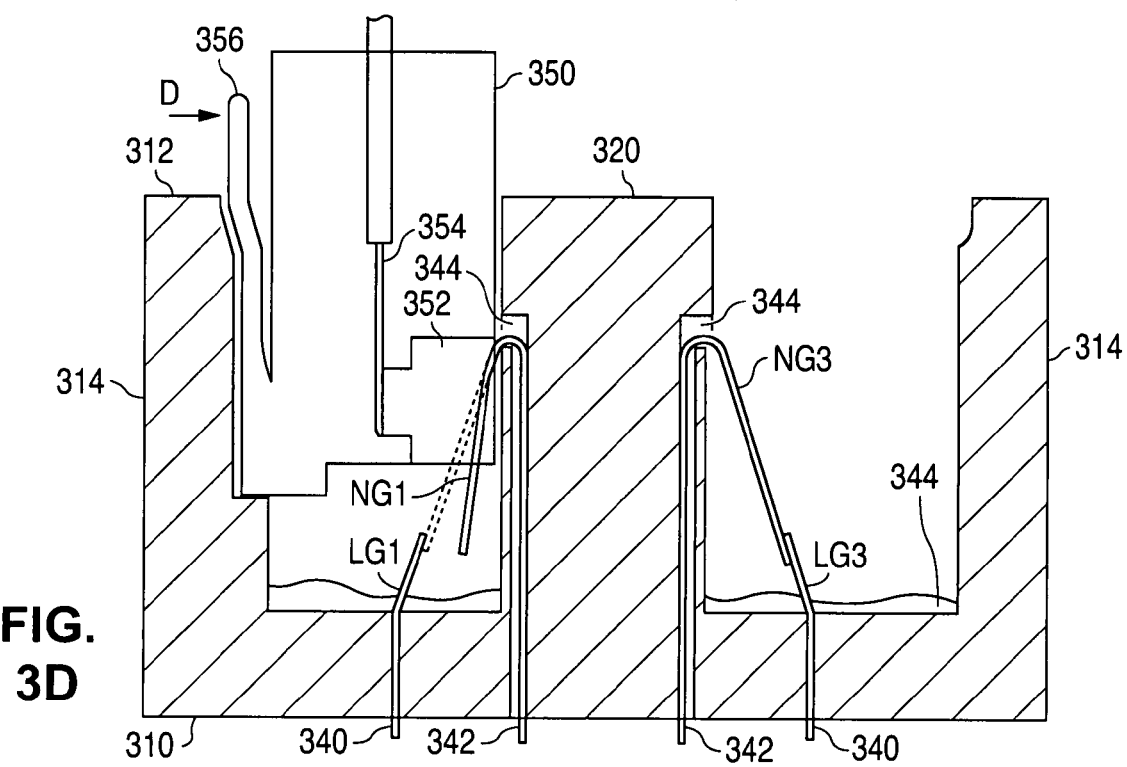

FIGS. 3C-3D show a series of cross-sectional views that illustrate the operation of multiport test jack 300 in accordance with the present invention. As shown in FIG. 3B, when opening 316 is free of a plug, each group LG of local wires 330 is connected to a corresponding group NG of network wires 332.

As shown in FIG. 3C, if a technician or customer wishes to check a telephone line following a service failure, such as the telephone line associated with the wires 340 and 342 in groups LG1 and NG1, a plug 350, such as an RJ11 plug, which is connected to a working telephone, is inserted into opening 316. Plug 350 includes a number of conductive blades 352 (only one blade 352 is shown in the figures), which are electrically and physically connected to wires 354 (only one wire 354 is shown in the figures) that run to the working telephone.

As shown in FIG. 3D, when plug 350 has been fully inserted into opening 316 such that multiport test jack 300 retains plug 350, plug 350 contacts the network wires 342 of group NG1 and physically separates and electrically disconnects the network wires 342 of group NG1 from the local wires 340 of group LG1. Thus, plug 350 physically and electrically disconnects only one group LG of local wires 340 from only one group NG of network wires 342. In addition, at the same time, each of the network wires 342 of group NG1 make a physical and electrical connection with the blades 352 in plug 350, and thereby to the working telephone.

Thus, if a dial tone can be detected after plug 350 has been fully inserted into opening 316, then any service (wiring or equipment) related problem lies on the customer side. On the other hand, if a dial tone can not be detected, then the service problem lies on the telephone service provider side.

Following this, if a technician or customer wishes to check another telephone line, such as the telephone line associated with the wires 340 and 342 in groups LG2 and NG2, plug 350 is first removed by depressing a release arm 366 on plug 350 in the direction of arrow D, and then pulling plug 350 away from multiport test jack 300. Following this, plug 350 is reinserted into multiport test jack 300 so that the blade 352 of plug 350 contact the network wires 342 that are associated with group NG2.

Thus, a multiport test jack has been described in accordance with an alternate embodiment of the present invention. Like multiport test jack 200, one of the advantages of multiport test jack 300, which is larger than multiport test jack 200, is that multiport test jack 300 is smaller than the combined size of a corresponding number of individual test jacks. Further, like multiport test jack 200, multiport test jack 300 can be fabricated in the same manner that conventional test jacks are fabricated.

It should be understood that the above descriptions are examples of the present invention, and that various alternatives of the invention described herein may be employed in practicing the invention. For example, although the present invention has been described with respect to RJ11 plugs and telephone lines, the present invention also applies to other types of plugs and lines, such as other types of RJ plugs, like an RJ45 plug, and other lines, like a data line. Thus, it is intended that the following claims define the scope of the invention and that structures and methods within the scope of these claims and their equivalents be covered thereby.

What is claimed is:

1. A multiport test jack comprising:
a body having a top surface, an opening in the top surface, and a number of wires that are exposed by the opening, the opening having a bottom surface, a first side wall that extends from the bottom surface towards the top surface, and a second side wall that extends from the bottom surface towards the top surface, the first and second side walls lying in parallel planes, the number of wires including two or more groups of local wires that extend into the opening, and two or more groups of network wires that extend into the opening, each group of local wires lying adjacent to a different sidewall.

2. The multiport test jack of claim 1 wherein the first side wall faces the second side wall.

3. The multiport test jack of claim 1 wherein the first side wall faces away from the second side wall.

4. The multiport test jack of claim 1 wherein:
each group of local wires extends through the bottom surface into the opening; and
a group of network wires extends from a side wall into the opening.

5. The multiport test jack of claim 1 and further comprising a gel that contacts a portion of the local and network wires.

6. The multiport test jack of claim 1 wherein each group of local wires is connected to a corresponding group of network wires when the opening is free of a plug.

7. The multiport test jack of claim 1 and further comprising a shroud that contacts the body, the shroud having a top surface and an opening in the top surface of the shroud that exposes the opening in the top surface of the body.

8. The multiport test jack of claim 7 wherein the opening in the top surface of the shroud directly exposes only one group of network wires.

9. The multiport test jack of claim 8 wherein the opening in the top surface of the shroud directly exposes only one group of local wires.

10. The multiport test jack of claim 8 wherein the shroud receives and retains a plug when the plug is inserted into the opening in the top surface of the shroud, an inserted plug electrically disconnecting only one group of local wires from only one group of network wires.

11. A multiport test jack comprising:
a body having an opening, and a number of wires that are exposed by the opening, the number of wires including two or more groups of local wires that extend into the opening, and two or more groups of network wires that extend into the opening, each group of local wires supporting a different telephone line.

12. The multiport test jack of claim 11 wherein each group of local wires is connected to a corresponding group of network wires when the opening is free of a plug.

13. The multiport test jack of claim 12 wherein only one group of local wires is disconnected from a corresponding group of network wires when the plug lies in the opening.

14. The multiport test jack of claim 11 and further comprising a shroud that contacts the body, the shroud having a top surface and an opening in the top surface of the shroud that exposes the opening in the top surface of the body.

15. The multiport test jack of claim 14 wherein the opening in the top surface of the shroud directly exposes only one group of network wires.

16. The multiport test jack of claim 14 wherein the opening in the top surface of the shroud directly exposes only one group of local wires.

17. A multiport test jack comprising:
a body having a top body surface, an opening in the top body surface, and a number of wires that are exposed by the opening, the number of wires including two or more groups of local wires that extend into the opening, and two or more groups of network wires that extend into the opening; and
a shroud that contacts the body, the shroud having a top shroud surface and an opening in the top shroud surface that exposes only a first group of local wires.

18. The multiport test jack of claim 17 wherein each group of local wires supports a different telephone line.

19. The multiport test jack of claim 17 wherein each group of local wires is connected to a corresponding group of network wires when the opening in the top shroud surface is free of a plug.

20. The multiport test jack of claim 19 wherein only one group of local wires is disconnected from a corresponding group of network wires when the plug lies in the opening in the top shroud surface.

21. A method of operating a multiport test jack comprising:
separating a body from a shroud, the body having a top body surface, an opening in the top body surface, and a number of wires that are exposed by the opening, the number of wires including two or more groups of local wires that extend into the opening, and two or more groups of network wires that extend into the opening, the shroud having a top shroud surface, and an opening in the top shroud surface that directly exposes only a first group of network wires before the body is separated from the shroud; and
reconnecting the shroud and the body together after the body has been separated from the shroud so that only a second group of network wires is directly exposed by the opening in the top shroud surface.

22. The method of claim 21 wherein the shroud and body are pulled in different directions to separate the shroud from the body.

23. The method of claim 21 and further comprising inserting a plug into the opening in the top shroud surface so that an inserted plug electrically disconnects one group of local wires from one group of network wires.

24. The method of claim 21 and further comprising inserting a plug into the opening in the top shroud surface so that an inserted plug electrically disconnects the second group of local wires from the second group of network wires.

25. The method of claim 24 wherein the inserted plug is electrically connected to the second group of network wires.

* * * * *

UNITED STATES PATENT AND TRADEMARK OFFICE
CERTIFICATE OF CORRECTION

| | | |
|---|---|---|
| PATENT NO. | : 8,057,246 B2 | |
| APPLICATION NO. | : 11/796022 | |
| DATED | : November 15, 2011 | |
| INVENTOR(S) | : Shuen-Yung Chan et al. | |

It is certified that error appears in the above-identified patent and that said Letters Patent is hereby corrected as shown below:

Column 5, Lines 18-19, please change "rotated counterclockwise 900 with" to --rotated counterclockwise 90° with--.

Signed and Sealed this
Third Day of January, 2012

David J. Kappos
*Director of the United States Patent and Trademark Office*